(12) United States Patent
Kent et al.

(10) Patent No.: US 6,236,391 B1
(45) Date of Patent: May 22, 2001

(54) ACOUSTIC TOUCH POSITION SENSOR USING A LOW ACOUSTIC LOSS TRANSPARENT SUBSTRATE

(75) Inventors: Joel Kent, Fremont, CA (US); Masahiro Tsumura, Hamadera-minami-machi (JP)

(73) Assignee: ELO TouchSystems, Inc., Fremont, CA (US)

( * ) Notice: Subject to any disclaimer, the term of this patent is extended or adjusted under 35 U.S.C. 154(b) by 0 days.

(21) Appl. No.: 08/954,838

(22) Filed: Oct. 21, 1997

Related U.S. Application Data

(63) Continuation-in-part of application No. 08/904,670, filed on Aug. 1, 1997, which is a continuation-in-part of application No. 08/377,183, filed on Jan. 24, 1995, now Pat. No. 5,708,461.

(30) Foreign Application Priority Data

May 14, 1997 (JP) .................................. H9-123858

(51) Int. Cl.$^7$ .............................. G09G 5/00; G08C 21/00
(52) U.S. Cl. ......................................... 345/177; 178/18.04
(58) Field of Search ........................... 345/177, 176, 345/173; 510/72, 69; 178/18.01, 18.03, 18.04

(56) References Cited

U.S. PATENT DOCUMENTS

| | | | |
|---|---|---|---|
| 5,162,618 | * 11/1992 | Knowles | 178/18 |
| 5,326,730 | * 7/1994 | Dumbaugh, Jr. et al. | 501/69 |
| 5,573,077 | * 11/1996 | Knowles | 345/177 |
| 5,591,945 | * 1/1997 | Kent | 178/19 |
| 5,708,461 | * 1/1998 | Kent | 345/177 |
| 5,854,450 | * 12/1998 | Kent | 178/18.04 |

* cited by examiner

Primary Examiner—Matthew Luu
Assistant Examiner—Anthony J. Blackman
(74) Attorney, Agent, or Firm—Milde, Hoffberg & Macklin, LLP

(57) ABSTRACT

An acoustic touch panel or "touch screen" utilizes acoustic waves within a sensor substrate to determine the position of touch. The substrate is made of a temperable glass having an attenuation coefficient of less than or equal to about 0.6 dB/cm as determined at the substrate surface for 5.53 MHz Rayleigh waves as measured by the slope of a plot of amplitude versus distance for a signal through a pair of facing 0.5-inch wide wedge transducers mounted on a sample of the glass type under test having sufficient thickness to support Rayleigh wave propagation. An acoustic touch panel with a tempered low-acoustic-loss glass substrate. This makes possible large tempered acoustic touch panels.

A glass substrate of the touch sensor comprises $SiO_2$ as the main component with a total content of $Na_2O$, CaO and MgO of 20% by weight or less and a total content of $Al_2O_3$, $ZrO_2$, $TiO_2$, $B_2O_3$, $Y_2O_3$, $SnO_2$, $PbO_2$, $In_2O_3$ and $K_2O$ of 5% by weight or more.

47 Claims, 3 Drawing Sheets

ACOUSTIC TOUCH POSITION SENSOR USING A LOW ACOUSTIC LOSS TRANSPARENT SUBSTRATE

CROSS REFERENCE TO RELATED APPLICATIONS

This application is a continuation-in-part of application Ser. No. 08/904,670, filed Aug. 1, 1997, entitled "Acoustic Touch Position Sensor Using a Low Acoustic Loss Transparent Substrate," which in turn is a continuation-in-part of application Ser. No. 08/377,183, filed Jan. 24, 1995, now U.S. Pat. No. 5,708,461, entitled "Acoustic Touch Position Sensor Using a Low-Loss Transparent Substrate."

TECHNICAL FIELD OF THE INVENTION

The present invention relates to an acoustic touch position sensor and more particularly to a touch panel of the type wherein an acoustic wave is generated within a substrate, the acoustic wave propagating in the substrate having a range of characteristic time delays from a transmitted signal, representing the differing path lengths associated with each axial displacement along an axis of the substrate. A touch on the substrate results in a perturbation of the wave, which is sensed to determine the axial displacement of the touch on the substrate. Touch panels of this type are used as computer input devices in connection with computer image displays.

BACKGROUND OF THE INVENTION

Conventional touch panels are utilized as input-output devices, applicable in various fields, in combination with a display device or unit such as a cathode ray tube (CRT), a liquid crystal display (LCD) or a plasma display panel (PDP). Resistive, capacitive, and acoustic touch panels are presently the dominant types of touch panels in the marketplace. Acoustic touch panels provide a more robust touch surface and greater image clarity than resistive and capacitive touch panels.

Resistive and capacitive touch panels include a resistance layer formed on a substrate. Due to its strength, optical clarity, and low cost, soda-lime glass is generally the preferred substrate material. The resistance layer is essential for the detection of touch position information. In addition, a conventional resistive touch panel includes an overlaying plastic cover sheet. For many applications, such added components to the glass substrate may be susceptible to accidental or malicious damage. Furthermore, these added components degrade the visibility of data and images in a display device as a result of decreased light transmission and increased reflection of ambient light.

In contrast, conventional acoustic touch panels can be advantageously employed in order to insure a robust touch surface and an enhanced display image quality. Because ultrasonic acoustic waves are used to detect coordinate data on input positions, a resistance layer need not be formed on the glass soda-lime substrate and no plastic cover sheet is required. Soda-lime glass is quite transparent and supports propagation of acoustic waves at ultrasonic frequencies. Soda-lime glass is the substrate material of conventional acoustic touch panels. For the end user, such an acoustic touch panel is optically and mechanically little more than a piece of windowpane glass.

Typically, 4% of incident light is reflected off each glass surface resulting in a maximum light transmission of about 92%. Reflection of ambient light reduces image contrast. These reflections are caused by the index-of-refraction mismatch between air and the glass substrate. Decreased light transmission reduces image brightness. These can be important effects when a touch panel is placed in front of a display device having a relatively low luminance (brightness) such as a liquid crystal display. Known methods for reducing reflections and increasing transmission are optical bonding or anti-reflective coatings. These methods address the index-of-refraction mismatch between air and glass. These methods do not improve the inherent transparency of the substrate material itself.

Soda-lime glass is not completely transparent. This is mainly due to color centers caused by iron ion impurities. These iron impurities decrease light transmission and distort the colors of displayed images. These are minor effects relative to, for example, the optical differences between acoustic and resistive touch panels. Nevertheless, improved transmission relative to common soda-lime glass would provide a useful enhancement of the optical advantages of acoustic touch panels.

Display technology is evolving rapidly. This evolution includes introduction and market acceptance of large sized display products. This in turn creates demand for larger touch panels. However, all touch panel technologies encounter problems when scaled to larger sizes. For resistive and capacitive touch panels, it becomes more difficult to maintain sufficient uniformity in resistance layers as panel sizes increase. For acoustic touch panels, the challenge for larger sizes is to assure sufficient signal amplitudes.

For acoustic touch panels, acoustic signals decrease as panel dimensions increase. This signal loss occurs because of the attenuation or damping of the ultrasonic waves as they propagate through the substrate. Thus, large-sized acoustic touch panels may fail to provide sufficient signal-to-noise ratio to reliably determine input positions. Hence there is a need for means to enhance the signal-to-noise ratio for acoustic touch panels. This is all the more true because there are other market pressures for product enhancements that reduce signal amplitudes: lower-cost controller electronics; reduced area reflective arrays; signal-absorbing seals; etc.

Due to the relatively long acoustic path lengths of commercially successful acoustic touch panel designs, acoustic attenuation properties of the glass substrate are particularly important. To understand the need for long acoustic path lengths, consider this first and simplest concept for acoustic touch panels.

Conceptually, the simplest acoustic touch position sensor is of the type described in U.S. Pat. No. 3,673,327. Such touch panels includes a plate having an array of transmitters positioned along one edge of a substrate for generating parallel beams of acoustic waves. A corresponding array of receivers is positioned along the opposite edge of the substrate. Touching the panel at a point causes attenuation in one of the beams of acoustic waves. Identification of the corresponding transmitter/receiver pair determines a coordinate of the touch. The acoustic touch panel disclosed in U.S. Pat. No. 3,673,327 uses a type of acoustic wave known as a "Rayleigh" wave. These Rayleigh waves need only propagate from one edge of the touch panel to the other. However, note that this type of acoustic touch panel requires many transducers, and hence associated cable conductors and electronics channels. This type of acoustic sensor has never been commercialized due to the expense of providing a large numbers of transducers.

Now consider acoustic touch panels that have been commercially successful. Representative of a set of pioneering patents in this field is Adler, U.S. Pat. No. Re. 33,151. An acoustic transducer generates a burst of waves that are coupled into a sheet-like substrate. These acoustic waves are deflected 90° into an active region of the system by an array of wave redirecting gratings. The redirecting gratings are oriented at 45° to the axis of propagation of waves from the transducer. These gratings are analogous to partially silvered mirrors in optics. Acoustic waves after traversing the active region are, in turn, redirected by another array of gratings towards an output transducer. A coordinate of the location of a touch is determined by analyzing a selective attenuation of the received signal in the time domain, each characteristic delay corresponding to a coordinate value of the touch on the surface. Use of the arrays of gratings greatly reduces the required number of transducers, thus making possible acoustic touch panels at commercially competitive prices. On the negative side, this clever use of grating arrays considerably increases the maximum distance acoustic waves must propagate through the substrate.

Signal amplitudes in acoustic touch panels are further decreased by inefficiencies in the scattering process at the grating arrays. Such inefficiencies can be minimized through proper array design. Efficient coherent scattering from the arrays is achieved by orienting the grating elements at a 45° angle and spacing them at integral multiples of the acoustic wavelength. Most efficient use of acoustic energy is provided when the acoustic power "illuminating" the active area is equalized. Known techniques compensate for the tendency for signal amplitudes to exponentially decay as a function of delay time. As described in lines 37 to 41 of column 11 of U.S. Pat. No. 4,746,914, signal equalization can be achieved with a constant wavelength spacing of the grates, i.e., reflecting elements, by providing reflecting elements which vary in height. An alternative method is to selectively drop grating elements to produce an approximately constant acoustic power density over the active area. In this case, the spacing between the grates decreases with increasing distance away from the transducer along the axis of the array. Applying these known methods avoids unnecessary inefficiencies in redirecting the acoustic waves. Nevertheless, the use of grating arrays to twice redirect the acoustic waves inevitably leads to signal losses. This increases the importance of minimum signal amplitude requirements in acoustic touch panel design.

The electronics for commercially available acoustic touch panel products are based on the basic concepts presented in Brenner et al., U.S. Pat. No. 4,644,100. This patent concerns a refinement of the system according to the U.S. Pat. No. Re. 33,151, wherein perturbations of a received signal are determined by comparing the received signal to a stored reference signal profile. By analyzing both the time delays and of the signal perturbations, the touch sensitive system employing acoustic waves is responsive to both the location and magnitude of a touch. Proper operation of the touch system requires a sufficiently large signal-to-noise ratio to avoid ambiguities between signal perturbations due to an acoustic-wave absorbing touch and signal variations due to electronic noise. Electronic noise may be due to fundamental noise from circuit components or due to electromagnetic interference. In recent years, the marketplace increasingly expects a fast touch response from light touches, which requires lower touch perturbation thresholds, and hence increases demand for a higher signal-to-noise ratio.

Further description of such Adler-type acoustic touch panels may be found in the above cited patents as well as in U.S. Pat. Nos. 4,642,423; 4,644,100; 4,645,870; 4,700,176; 4,746,914 and 4,791,416. For each coordinate axis detected, acoustic waves are generated in, e.g., a glass substrate by a transducer containing a piezoelectric element. Thus, a transmitted wave packet is dispersed along the axis of the transmitting reflective array, traverses the substrate and is recombined into an axially propagating wave by another reflective grating, and is directed to a receiving transducer in a direction anti-parallel to the initial transmitted wave. The wave packet is dispersed in time according to the path taken across the substrate. The received waveform is converted into an electrical signal for processing. The time delay of a perturbation of the electrical signal corresponds to a distance traveled by the perturbed component of the wave. Thus, according to this system, only two transducers per axis are required. Typically both X and Y coordinates are measured; this can be done with a total of only four transducers.

Variations of the above acoustic touch panel systems are possible with further reductions in the numbers of transducers. The acoustic wave may be reflected by 180° near or at the edge of the substrate parallel to the axis of the transmission reflective grating and reflected back through the substrate to the reflective array and retrace its path back to the transducer. The transducer, in this case, is configured to act as both transmitter and receiver at appropriate time periods. A second transducer, reflective array and reflective edge are provided for an axis at right angles to allow determination of both coordinates of touch. Still another system provides for a single transducer that produces a wave for detecting a touch on two axes and also receives the wave from both axes. Reducing the number of transducers increases the corresponding acoustic path lengths for a given touch panel size. This increases the signal loss due to acoustic damping within the substrate material.

The touch activating an acoustic touch panel may be due to a finger, gloved or ungloved, or a stylus pressing against the surface. Optionally, the finger or stylus may act indirectly through a cover sheet placed over the glass substrate surface.

There are several modes that ultrasonic waves can take in glass substrates. The mode referred to as a "Rayleigh" wave is of particular interest for acoustic touch panels. Rayleigh waves are essentially confined to a single surface of a sheet of uniform, non-piezoelectric medium of a sufficient finite thickness. Mathematically, Lord Rayleigh calculated the wave function for this mode for a semi-infinite medium. Such waves guided near a surface of a medium of finite thickness are more precisely termed "quasi-Rayleigh" waves, although such waves are generally referred to as "Rayleigh waves" and are so denominated herein. Practical experience with touch panel design and manufacture has shown that about four Rayleigh wavelengths or more is a sufficient substrate thickness to successfully propagate Rayleigh waves.

Other acoustic modes have been investigated for use in acoustic touch panels. U.S. Pat. Nos. 5,260,521; 5,234,148; 5,177,327; 5,162,618 and 5,072,427 disclose the .use of horizontally polarized shear waves and Lamb waves in Adler-type acoustic touch panels. U.S. Pat. No. 5,591,945 discloses further options regarding the choice of acoustic modes in acoustic touch panels. Nevertheless, Rayleigh waves have been, and are expected to remain, the most commonly used acoustic mode in acoustic touch panels. This is due to the relatively high sensitivity of Rayleigh waves to touches and due to their ability to be propagated by a simple surface of a homogeneous medium.

For commercial acoustic touch panels, the frequency of the ultrasonic acoustic waves is around 5 MHz. For acoustic touch panels employing Rayleigh waves, the thicknesses of the soda-lime glass substrates for commercial products to date are in the range from 2 mm to 12 mm. Acoustic touch panel products employing lowest order horizontally polarized shear waves are currently made of 1 mm thick soda-lime glass.

Acoustic touch panels, of the type that has proved to be commercially viable, make clever use of reflective arrays to reduce the number of transducers and electronic channels, and to provide a reliable and accurate time-based analog measurement of touch position. This has proved essential to the commercialization of acoustic touch panels. However, the resulting relatively long acoustic path lengths, along with the losses from two acoustic scatters, leads to small received signal amplitudes. With such small signal amplitudes, it is difficult to assure a sufficient signal-to-noise ratio for reliable signal processing in a touch sensor of the type which transmits ultrasonic acoustic waves in a glass substrate.

Many terms have been used to describe acoustic touch panels: "acoustic sensors", "acoustic touch screens", "ultrasonic touch panels", etc. Unless stated otherwise, all these terms are considered here to be synonyms for a transparent touch sensor which senses touches with ultrasonic acoustic waves and which use reflective arrays of gratings to enable a reduced number of transducers.

There is a need for means to increase signal amplitudes in acoustic touch panels.

SUMMARY OF THE INVENTION

It is, therefore, an object of the present invention to provide an acoustic touch panel whose glass substrate has a low rate of acoustic attenuation or damping and which insures an acceptable intensity of transmitted signals.

It is a further object of the present invention to provide an acoustic touch panel which is more reliable and robust with respect to electromagnetic interference than such touch position sensors known heretofore.

It is a further object of the present invention to provide an acoustic touch panel that can operate reliably with a reduced cost controller with transmit-burst amplitudes of about 10 Volts peak-to-peak or less.

It is a further object of the present invention to provide an acoustic touch panel that includes mechanically compact transducers of reduced signal-conversion efficiency.

It is a further object of the present invention to provide an acoustic touch panel that permits the use of seals that cause significant acoustic signal absorption.

It is a further object of the present invention to provide an acoustic touch panel of increased dimensions.

It is a further object of the present invention to provide a touch panel that presents a reliable and robust touch surface to the user even when roughly handled.

It is a still further object of the invention to provide a temperable, low acoustic loss substrate for a touch panel that may be either thermally tempered or chemically hardened, thereby making possible large tempered touch panels.

It is an object of the present invention to increase the signal-to-noise ratio in an acoustic touch panel which employs Rayleigh waves.

Another object of the present invention is to provide a touch panel that insures a high light transmission and clear display of data by the display device.

Extensive research has led to the achievement of the above objects and to the discovery that the use of specific glass substrates or bases as a propagation medium for ultrasonic acoustic waves can suppress attenuation (damping) of the ultrasonic acoustic waves to a great extent, and can also transmit signals while keeping their intensity high until they are received and detected. The present invention is based on the above findings.

These objects, as well as other objects which will become apparent from the discussion that follows, are achieved, in accordance with the present invention by providing a touch panel having a glass substrate as a propagation medium for ultrasonic acoustic waves and which is used for detecting the coordinate data on a position touched. In this glass substrate, comprising $SiO_2$ as the main component, the total content of $Na_2O$, $CaO$ and $MgO$ is 20% by weight or less, and the total content of $Al_2O_3$, $ZrO_2$, $TiO_2$, $B_2O_3$, $Y_2O_3$, $SnO_2$, $PbO_2$, $In_2O_3$ and $K_2O$ is generally 5% by weight or more.

While this invention was the result of unanticipated experimental results, the following conceptual framework serves to clarify the nature of the invention.

Glass is basically silicon dioxide, $SiO_2$, in which sufficient amounts of other compounds have been added to disrupt the formation of a regular lattice of Si—O—Si covalent bonds that otherwise would form crystalline quartz. For example, addition of $Na_2O$, results in the replacement of a Si—O—Si link of covalent bonds between two silicon atoms with a break in the covalent link, Si—O$^-$/O$^-$Si, plus two Na$^+$ ions. Similarly, the addition of CaO or MgO results in a break in the covalent link, Si—O—/O—Si, plus a $Ca^{2+}$ or a $Mg^{2+}$ ion. In this manner, addition of a sufficient amount of "soda" and "lime" results in an amorphous glass rather than crystalline quartz.

It is known that the transition from a crystalline to an amorphous material results in increased damping. For example, consider the following translation of a passage from an acoustics textbook of Royer and Dieulesaint (*Ondes elastiques dans les solides*, Tome 1, page XV, publisher Masson):

> Solids used in applications requiring waves of relatively high frequency (>100 MHz, for example for signal processing) are crystals because mechanical vibrations are attenuated less as the materials in which they propagate are more ordered.

This implies that the use of glass, an amorphous material, rather than a crystalline material like quartz, inevitably results in increased acoustic losses.

The inventors unexpectedly discovered that additions of different compounds to silicon dioxide, all sufficient to induce a transition to an amorphous glassy state, vary widely in their effect on acoustic attenuation. Certain glass compositions lead to significantly less acoustic absorption than is present in soda-lime glass. Furthermore, a pattern has been observed.

Acoustic attenuation is relatively larger if the additions replace the Si—O—Si covalent links with weak ionic-bonding links and the acoustic attenuation is relatively smaller if the additions replace Si—O—Si covalent bonds with alternate covalent bonds, strong ionic bonds, or sterically constrained ionic bonds. The addition of $B_2O_3$ leads to B—O—Si bonds. It does not result in breaks in the material's covalent-bond network such as Si—O$^-$/O$^-$Si. This is an example of establishing alternate covalent links.

Additions that lead to positive ions of high charge states of three or more, e.g. $Al^{3+}$ and $Zr^{4+}$, lead to strong ionic bonds. The oxygen ions at the end of covalent chains, Si—O$^-$, will form strong ionic bonds with ions of high charge states. Such ionic bonds with high-charge-state ions are strong because the electrostatic binding forces are proportional to the charges of the participating ions. Strong ionic bonds are formed where the Si—O—Si covalent bonds have been broken.

For additions of the form $X_2O_3$ or $XO_2$, it may not be clear whether the element X forms alternate covalent links, X—O—Si, or whether the element X forms high charge state ions, $X^{3+}$ or $X^{4+}$. In either case, the result is same. The network of molecular bonds is strengthened relative to additions of the form $X_2O$ and XO. While this does not make the network any more ordered, it is empirically observed to reduce acoustic attenuation.

While $K_2O$ and BaO are of the same form $X_2O$ and XO form as $Na_2O$ and CaO and MgO, the corresponding ionic radii are very different. The ionic radius of $K^+$ is 1.33 Angstroms and the ionic radius of $Ba^{2+}$ is 1.35. In contrast, the ionic radii of $Na^+$, $Ca^{2+}$, and $Mg^{2+}$ are 0.95, 0.99, and 0.65 respectively. All these ions will be attracted to the negative charges of the negative oxygen atoms terminating the covalent network. However, the large size of, e.g. K+and Ba ions, relative to, e,g., $Na^+$, $Ca^{2+}$, and $Mg^{2+}$ ions, lead to steric effects due to space filling in the region of broken covalent links, Si—O—/O—Si. The inventors interpret their observations and discoveries, in part, as due to such steric effects resulting in a suppression of acoustic damping when ionic radii exceed about 1.1 Angstroms.

Steric effects are most pronounced for singly-charged large-radius ions from additions of the form $X_2O$. This is because there are two $X^+$ ions per broken covalent link Si—O⁻/O⁻Si. $K^+$ is the most important example for $X^+$. Steric effects of $K^+$ ions in glass are known and are the basis for chemically hardening of glass.

The doubly charged ions of larger radii, e.g., $Ba^{2+}$ and $Sr^{2+}$, will have stronger steric effects than the smaller doubly charged ions $Mg^{2+}$ and $Ca^{2+}$, but will have weaker steric effects than pairs of large singly charged ions like $K^+$, $Ba^{2+}$ and $Sr^{2+}$ are more neutral in their acoustic effects.

The above conceptual framework provides a context for the invention specified below.

The touch panel of the present invention is provided with a glass substrate as a propagation medium for the ultrasonic acoustic waves, which is used for detecting the coordinate data on a position touched, whose total content of $Na_2O$, CaO and MgO in the glass substrate is 20% by weight or less and whose total content of $Al_2O_3$, $ZrO_2$, $TiO_2$, $B_2O_3$, $Y_2O_3$, $SnO_2$, $PbO_2$, $In_2O_3$ and $K_2O$ is generally 5% by weight or more.

The use of such a glass substrate as a propagation medium for the ultrasonic acoustic waves suppresses the attenuation or damping of ultrasonic acoustic waves and insures that a high or an acceptable signal intensity is received.

The touch panel of the present invention also is provided with a glass substrate as a propagation medium for the ultrasonic acoustic waves, which is used for detecting the coordinate data on a position touched and in which the glass substrate has a higher light transmission than a soda-lime glass in the visible ray region.

These objects are further achieved, in accordance with the present invention, by providing an acoustic touch position sensor of the type described above with a substrate made of a transparent material, such as a temperable or tempered glass, preferably a barium-containing glass, which exhibits substantially less acoustic absorption than conventional soda-lime glass.

By "temperable glass" is meant a glass that is capable of being either thermally tempered or substantially chemically hardened.

Thermal tempering occurs when the glass is heated until it is glowing red hot and then rapidly cooled, thereby placing the glass at both surfaces under very high compression because they were cooled so quickly. For fully tempered glass, this may be about 15,000 psi. It is also possible to partially thermally temper the glass to, e.g., about 10,000 psi. The internal portion of the glass cools more slowly, and is under tension, being stretched parallel to the surfaces by both surfaces. Glass can only be heat tempered if it has a sufficiently large thermal expansion coefficient, i.e., has a thermal expansion coefficient greater than about $6\times10^{-6}/K$ before tempering.

Chemical hardening of glass takes place by the replacement of some of the lower alkali metal ions present at the surface of the glass with ions of higher alkali metals, e.g., the replacement of lithium and/or sodium ions with potassium ions. The chemical hardening process is generally disclosed in U.S. Pat. No. 3,954,487, which is incorporated herein by reference. Here we are interested in glasses that can be "substantially" chemically hardened, i.e., to an increase in strength of at least about 50%, preferably to an increase in strength of at least about 100%.

It has been discovered, quite unexpectedly, that the use of a temperable barium-containing glass as a substrate for acoustic touch panels that employ Rayleigh waves adds between 10 and 30 dB to the signal-to-noise ratio as compared to equivalent acoustic touch panels using soda-lime glass as the substrate.

On a tonnage basis, the vast bulk of glass produced in the world is soda-lime glass. For example, "window pane" glass is soda-lime glass. Car windows and mirrors are made with soda-lime glass. Being the lowest cost glass material, soda-lime glass is the natural choice for a transparent substrate material. Consequently, all Adler-type acoustic touch panels known to recent dates, excepting this invention, have been based on a glass substrate formed of soda-lime glass.

Borosilicate glass was originally developed by Dow Corning and marketed by Corning under the brand name "Pyrex." This glass, although somewhat more expensive than soda-lime glass, has found a mass market mainly due to its small coefficient of thermal expansion which enables it to endure large temperature gradients without cracking. Schott Glass also presently markets a borosilicate glass under the brand names "Tempax" and "BoroFloat".

In a simple experiment, it has been demonstrated that borosilicate glass is approximately one half as absorptive to Rayleigh waves as soda-lime glass. FIG. 3 illustrates the measurement method used to determine Rayleigh-wave attenuation in glass. A transmit and receive transducer pair, 2 and 4, respectively, was placed on the glass and the distance between them was varied between two inches, four inches and six inches. Measurements were taken with two samples of soda-lime glass and two samples of borosilicate glass at each of the distances. In this case, the borosilicate glass was a sheet of Tempax glass manufactured by Schott. The results are illustrated graphically in FIG. 4.

As may be seen in FIG. 4, the attenuation in the soda-lime glass was approximately twice the attenuation measured for the borosilicate glass. The soda-lime glass exhibited an attenuation of 1.44 dB per inch; the borosilicate glass attenuated the same signal by 0.74 dB per inch. Relative to soda-lime glass, these data imply that borosilicate glass has 0.70 dB of additional signal per inch of acoustic path. For a maximum acoustic path length of twenty to forty inches, this implies 14 to 28 dB of additional signal.

Follow-up measurements were made with Schott's "Borofloat" borosilicate glass and soda-lime glass from a variety of sources. The results confirm the advantage of borosilicate over soda-lime glass.

In experiments, all barium-containing glasses tested share the low acoustic loss characteristics of borosilicate glass. An example of a barium-containing glass is the structural element of the faceplate used in the manufacture of the Zenith 1490 FTM (flat tension mask) monitor. Samples measured were observed to have an acoustic attenuation of approximately 0.6 dB/inch. Similar low acoustic attenuation was observed on the faceplates of a variety of cathode-ray tubes of a variety of monitor products: MiniMicro MM1453M; Mitsubishi AUM-1371; Quimax DM-14+; NEC A4040; and Goldstar 1420-Plus. Another example of a barium-containing glass is Schott B-270 glass, which is reported to have the approximate composition (weight % on oxide basis) $SiO_2$: 69.5, $Na_2O$: 8.1, $K_2O$: 8.3, CaO: 7.1, BaO: 2.1, ZnO: 4.2, $TiO_2$: 0.5, $Sb_2O_3$: 0.5.

Use of a low-loss glass in an acoustic touch panel according to the invention thus provides an extra measure of signal "budget" due to the increased signal-to-noise ratio. This increased budget makes it possible to achieve many objectives that, at least superficially, appear to be unrelated to the choice of substrate material. These are enumerated below:

(1) The increased signal-to-noise ratio makes it possible to reduce the cost of the electronic controller associated with the touch panel. In particular, the burst circuit of the controller, which sends a tone burst to the touch panel transmitting transducers, may be simplified by reducing the burst amplitude to, e.g., transistor—transistor logic (TTL) voltage levels, making it possible to use lower-cost circuits at the output stage. Reducing the burst amplitude also has the advantage of reducing EMI emissions from the controller.

(2) Acoustic touch panels of the type disclosed in the U.S. Pat. No. Re. 33,151 use reflective arrays to minimize the number of transducers and electronic channels and to provide a reliable and accurate time-based analog measurement of touch position. However, the resulting relatively long acoustic wave path lengths, along with the losses from two acoustic wave scatters, leads to small received signal amplitudes and limits the overall size of the touch panel. An increase in the signal-to-noise ratio, resulting from the use of borosilicate glass or barium-containing glass, makes it possible to increase the overall size of this type of touch panel. For example, rectangular touch panels may have a diagonal dimension of at least twenty-one inches.

(3) It is often necessary to allow contact between the sensitive portion of the touch panel and the adjacent objects. For example, a CRT housing or bezel may make contact with an acoustic touch panel in such a fashion to protect and enclose the reflective arrays and transducers. Such contact may be effected by means of a resilient and water-tight seal, such as an RTV seal, between the touch panel substrate and the adjacent object. Such seals absorb acoustic wave energy, making it highly desirable to increase the signal-to-noise ratio prior to application of the seal.

(4) For many applications, assuring proper mechanical fit of a touch panel into a touch/display system involves optimizing the mechanical design at the expense of acoustic signal amplitudes. Mechanically compact transducers may be designed with less than optimal acoustic performance. Reflective arrays may be designed to be narrower than optimal for signal performance to accommodate mechanical constraints. The less signal that is lost due to damping in the substrate material, the more flexibility the design engineer has to improve mechanical fit at the expense of signal amplitude.

Due to its durability, scratch resistance and optical clarity, soda-lime glass has been the material of choice for acoustic touch panels. As noted above, borosilicate and barium-containing glasses provide these mechanical and optical advantages and at the same time, increase the signal-to-noise ratio. The experiments referred to above show a pronounced improvement over soda-lime glass.

The experiments were performed using the most important acoustic mode for acoustic touch panels: Rayleigh waves. As with soda-lime glass, other acoustic modes such as Lamb waves and shear waves may be caused to propagate in borosilicate or barium-containing glass substrates. A pattern has been observed of reduced acoustic attenuation in glasses with compositions that minimize the number of unconstrained broken links $Si—O^-/O^-Si$. There is every reason to believe that this general pattern is independent of acoustic mode.

The energy in Rayleigh waves is in the form of both shear and longitudinal stresses, strains and motions, and hence Rayleigh waves are subject to the damping mechanisms corresponding to these forms of energy. Shear waves have energy only in the form of shear strains, stresses and motion, and hence the damping mechanisms for shear waves are a subset of the damping mechanisms for Rayleigh waves. With the exception of a flexural wave, which contains only shear energy, Lamb waves have energy in both shear and longitudinal forms and hence share the same damping mechanisms, though in different proportions, as Rayleigh waves. Due to shared damping mechanisms, borosilicate and barium-containing glasses have reduced attenuation relative to soda-lime glass for all acoustic modes.

For a full understanding of the present invention, reference should now be made to the following detailed description of the preferred embodiments of the invention.

DESCRIPTION OF THE PREFERRED EMBODIMENTS

Figure 1:
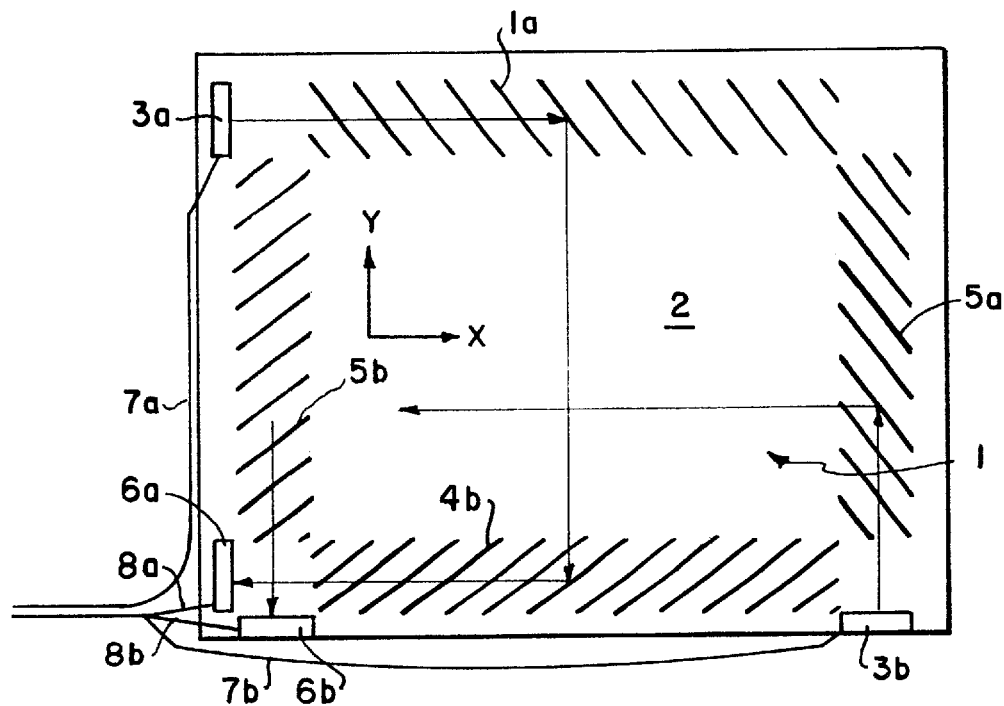
FIG. 1 is a schematic plan view showing one embodiment of the acoustic touch panel of the present invention.

In the present invention, the propagation medium for the ultrasonic acoustic waves comprises a specific glass substrate or base. A touch type panel composed of the glass substrate serves to provide coordinate data of a touch position.

A feature of the touch panel of the present invention resides in the use of a glass substrate on which information is input by a touch, said glass being comprised of $SiO_2$ as the main component with a low total content of $Na_2O$, CaO and MgO (hereinafter, these three compounds may be generically referred to as the first component).

The content of $SiO_2$ is, for instance, about 55 to 90% by weight and preferably about 60 to 85% by weight (e.g., 65 to 85% by weight).

As the content of the first component becomes larger, the attenuation or damping ratio of the ultrasonic acoustic waves increases on the one hand, and the intensity of the received signal decreases on the other. This is presumably because the first component contained in the glass breaks Si—O—Si covalent links in the $SiO_2$ covalent network without replacing these broken links with alternate covalent-bond links, strong ionic-bond links, or sterically constrained ionic-bond links. Therefore, the total content of the first component should be kept low. Particularly desirable is a glass substrate having a lower total content of the first component than that of the soda-lime glass, which is a conventional and common glass. That is, it is preferable to use a glass substrate with a total first component content of 20% by weight or less (i.e., 0 to 20% by weight). A preferable glass substrate comprises a glass having a total first component content of about 0 to 18% by weight (e.g., 1 to 17% by weight) and especially about 0 to 17% by weight (e.g., 2 to 16% by weight).

The increase in the content of a component that avoids poorly constrained broken Si—O—Si covalent links causes a lower attenuation or damping of the ultrasonic acoustic waves. A rise of an attenuation or damping as well as a fall of the intensity of received signals can be prevented by the use of a glass substrate which has a high total content of $Al_2O_3$, $ZrO_2$, $TiO_2$, $B_2O_3$, $Y_2O_3$, $SnO_2$, $PbO_2$, $In_2O_3$ and $K_2O$ (hereinafter, these components may be simply referred to as the second component). It is particularly preferable that the second component is present in a higher total content than is present in soda-lime glass, namely, the total second component content should be 5% by weight or more (e.g., 5 to 25% by weight). A desirable glass substrate contains the second component in about 5 to 20% by weight and particularly about 7 to 20% by weight (e.g., 7 to 18% by weight) on aggregate.

As long as the total content of the first component and that of the second component stay in the above ranges, the glass substrate need not contain all of the first components or of the second components, respectively. To be specific, the glass substrate may comprise at least one compound, or even no compounds, among the first component ($Na_2O$, CaO, MgO), or may comprise at least one compound among the second component ($Al_2O_3$, $ZrO_2$, $TiO_2$, etc.).

The glass substrate may further contain various components such as an oxide (e.g., BaO, ZnO, BeO, $Li_2O$, $TeO_2$, $V_2O_5$, $P_2O_5$), a fusing agent, a clarifier, a coloring agent, a decolorizer or other components.

The glass substrate of the touch panel of this invention on which data are input by a touch is disposed on the display device, the data displayed by the display device being visible through the touch panel. Therefore, it is desirable that the glass substrate constituting the touch panel has an excellent light transmission in the visible ray region (wavelength of about 400 to 700 nm). In terms of noise-inhibition, it is desirable for the glass substrate which exhibits a high transmission in the visible ray region to have a greater intensity of the received signal than soda-lime glass. The glass substrate with a high transmission rate may be made up of a glass which comprises $SiO_2$ as the main component and also contains the first component and the second component, or other glasses (e.g., a non-oxide glass).

In optically demanding applications, the acoustic touch panel may be optically bonded to the display device, thus eliminating reflections and transmission losses from the back surface of the touch panel and the front surface of the display.

To avoid distracting reflections off an acoustic touch panel, an anti-glare treatment may be applied, e.g., an uneven coating using a silica or a chemical etch. Alternatively (if fingerprints are not a problem), an antireflection coating may be applied. In both cases, the surface treatment is very superficial compared to the acoustic wavelength and the glass substrate still determines the relevant acoustic properties of the panel.

As the glass for the substrate of this invention there may be mentioned other glasses which have the above composition or characteristics, such as a lead glass, an alminoborosilicate glass, an alminosilicate glass, a borosilicate glass and the like.

The touch panel of this invention disposed on the display device can be used in combination with a liquid crystal display device, a plasma display panel device or the like.

FIG. 1 is a schematic plan view showing an embodiment of the touch panel according to the present invention.

The touch panel shown in FIG. 1 comprises the glass substrate 1 as a propagation medium having a display area (an image display area) 2 being touchable and laterally symmetrical in the directions of the X-axis and the Y-axis formed on its surface. Acoustic waves propagating in the substrate have sufficient power density at the surface to be measurably attenuated by touches on the surface.

Transmitting means 3a and 3b transmit the acoustic waves in the directions of the X-axis and the Y-axis of the glass substrate. These transmitting means comprise electroacoustic transducers, e.g., ceramic piezoelectric elements, and perhaps also mode converting elements such as a plastic wedge of a wedge transducer. These transducing means are disposed at predetermined positions on the glass substrate 1 so as to direct acoustic beams towards transmitting reflective grating arrays 4a and 5a.

The acoustic waves from the transmitting means in the directions of the X-axis and the Y-axis are redirected and propagated in the directions of the Y-axis and the X-axis over the whole of the display area 2 by a reflecting means comprising first reflecting arrays (first reflecting means) 4a and 4b formed on both edges in the direction of the Y-axis and second reflecting arrays (second reflecting means) 5a and 5b formed on both edges in the direction of the X-axis, and the acoustic waves are redirected or converged in the directions of the X-axis and the Y-axis to be received by receiving means.

The receiving means 6a and 6b comprise the same members as the transmitting means. The distinction between transmitting means and receiving means is largely determined by the connections to the electronics. If items 6a and 6b are connected to excitation circuitry and 3a and 3b are connected to receiving circuitry, then 6a and 6b will serve as transmitting means and 3a and 3b will serve as receiving means.

Signal cables 7a and 7b are connected to the transmitting elements, while signal cables 8a and 8b are connected to the receiving elements.

In this device, when an excitation signal, such as a tone burst of a few dozen cycles, is intermittently transmitted via cables 7a (or 7b) to transmitting means 3a (or 3b), the ultrasonic acoustic waves are reflected by reflecting arrays 4a (or 5a), propagated through the surface of the glass substrate 1, reflected by the reflecting arrays 4b (or 5b) to be received by receiving means 6a (or 6b). The total acoustic delay is well under one millisecond, and hence there is time within human reaction time to sequentially excite the X and Y coordinate measuring subsystems. The received signal is sent to a signal-processing controller via signal cables 8a (or 8b), where the controller recognizes the received signal and detects its intensity.

The touch panel of FIG. 1 is typically intended to be placed in front a display device and to serve as a computer peripheral to the same host computer that controls the display device and perhaps other output devices such as a sound system. Typically, application software on the host computer provides feedback to the human user when a touch has been detected. This feedback may take many forms. Examples are highlighting the icon in the displayed image, an audible click or bell sound from a speaker, or simply performance of the desired touch control function. Of course, all this desired performance depends on the acoustic touch panel system correctly detecting a touch, which in turn depends on maintaining an acceptable signal-to-noise ratio.

Acoustic waves lose intensity as they propagate through the glass substrate of a touch panel. This physical effect, the attenuation of acoustic energy by the substrate, is a key factor in determining the signal amplitudes for an acoustic touch panel system. In the touch panel of the present invention, use of selected glass substrates reduces attenuation or damping of the ultrasonic acoustic waves and insures detection of the received signal with a sufficient intensity. Consequently, touch positions can be detected reliably and with precision.

Figure 3:
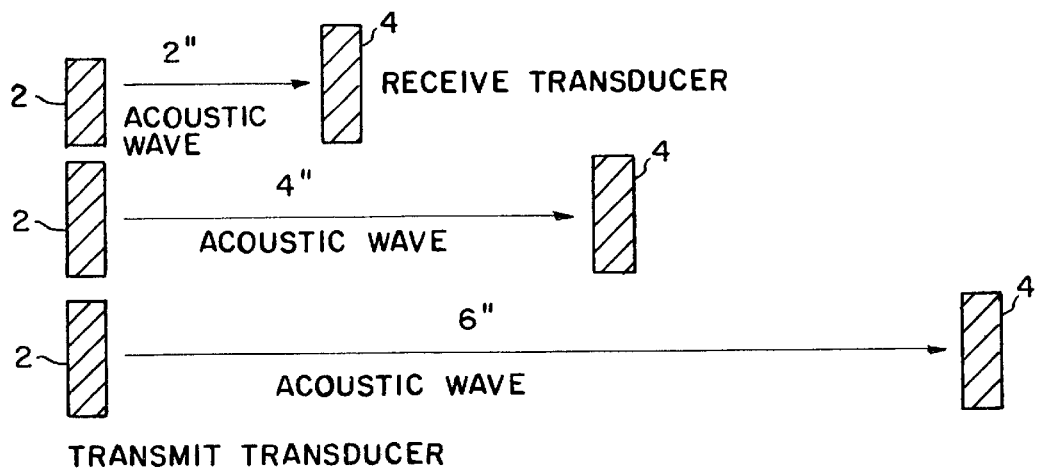
FIG. 3 is a diagram illustrating a method for measuring attenuation of acoustic waves in a substrate.

Tests were conducted using piezoelectric transmitting transducers and receiving transducers mounted on sheets of soda-lime glass and borosilicate glass at different distances to measure the acoustic attenuation. See FIG. 3 and FIG. 4. Two sheets of soda-lime glass (soda-lime No. 1 and soda-lime No. 2) and two sheets of borosilicate glass (borosilicate No. 1 and borosilicate No. 2) were tested. The borosilicate glass was manufactured by Schott Glass Co. and sold under the trademark "Tempax". The data clearly reveal that Rayleigh waves are subject to approximately fifty percent less attenuation in borosilicate than in soda-lime glass. The average attenuation for the borosilicate glass was 0.74 dB/inch, whereas the average attenuation for soda-lime glass was 1.44 dB/inch.

The signal gain due to the use of borosilicate glass rather than soda-lime glass depends on the distance that acoustic waves propagate in the substrate. The maximum path length from the transmitting transducer, e.g. 3a, to the receiving transducer is approximately the full length of the transmitting reflective array, e.g. 4a, plus the inside spacing between the reflective arrays, plus the full length of the reflective array 4b. For present commercial products, this maximum path length is typically in the range from 20 to 40 inches.

For a maximum path length in a 20 to 40 inch range, and an attenuation (for 5.53 MHz Rayleigh waves in soda-lime glass) of approximately 1.5 dB/inch, the signal loss due to substrate attenuation is in the range of from 30 to 60 dB. Since the total attenuation for touch panels is typically in the range of 80 to 100 dB, the loss due to substrate attenuation is a substantial percentage (approximately 50%) of this total value.

Consequently, if borosilicate glass, or some other transparent material with substantially less acoustic absorption than soda-lime glass, is used as the substrate in place of soda-lime glass, it is possible to substantially increase the available signal received by the receiving transducer. In particular, the data above implies an additional 0.7 dB of signal per inch of acoustic path length. For a maximum acoustic path range of 20 to 40 inches, this implies 14 to 28 dB of additional signal. For acoustic touch panels of sizes larger than present commercial products, the signal gain is larger.

Acoustic attenuation is an increasing function of frequency. The quantitative measurements and calculations above were performed with a test frequency of 5.53 MHz. If a product is designed for a higher operating frequency, the acoustic attenuation will be greater and the gain from using a lower acoustic loss glass will also be greater. If a product is designed for a lower frequency, the opposite will be true. While quantitative numbers will change, the qualitative advantages of a low-acoustic-loss glass substrate remain. Test measurements of acoustic damping at 5.53 MHz are of relevance for identifying low-acoustic-loss glass substrates for use in products with operating frequencies anywhere within a broad range, e.g., from 3 to 10 MHz.

To be explicit, we may define "low-acoustic-loss glass" as follows: less than 0.5 dB/cm acoustic attenuation for 5.53 MHz Rayleigh waves as measured by the slope of a plot of amplitude versus distance for a signal through a pair of facing 0.5 inch wide wedge transducers mounted on the glass under test.

Data from touch panels assembled with "BoroFloat" borosilicate glass show markedly increased signal amplitudes. This demonstrates that both "BoroFloat" and "Tempax" borosilicate glass provide similar acoustic advantages.

For some applications, it is desirable to use a tempered glass substrate. Due to its low thermal expansion coefficient, borosilicate glass cannot be heat tempered. Due to a low percentage or even a lack of sodium ions that can be replaced by potassium ions, common borosilicate glass can be chemically hardened only to a very limited degree. For applications demanding tempered glass substrates, it is preferable to use a temperable glass with low acoustic losses. It has been discovered that this is made possible by the selection of barium-containing glass as the substrate material for acoustic touch panels.

The discovery that acoustic wave losses are much less for borosilicate glass and barium-containing glass than soda-lime glass forms the basis for PCT International Application No. WO96/23292, which was published on Aug. 1, 1996. It has further been discovered that B270™ glass of Schott Glass, is an example of barium-containing glass (2.1% BaO) with low-acoustic-loss, that can be easily and economically purchased in sheet form, and that can optionally be heat tempered or chemically hardened. The additional signal amplitude provided by the use of a borosilicate glass or barium-containing glass substrate makes possible a number of product enhancements that, by themselves, lead to undesirable losses in signal to-noise ratio. Several of these product enhancements will now be described.

In the design of transducers, e.g. items 3a, 3b, 6a, and 6b, the design engineer often faces a trade-off between signal amplitude and mechanical fit of the touch panel inside the display device housing. In some cases, the design engineer can avoid mechanical interferences by reducing the width of the transducer from, e.g., 0.5 inch to 0.25 inch. The reduced width transducer leads to signal losses, in part because of the increased angular divergence of an acoustic beam from a narrower transducer. In other cases, the design engineer may include a beveled surface on the edge of the glass substrate in which to mount, e.g. a wedge transducer. If the bevel angle is sufficiently steep to equal or exceed the wedge angle, e.g. 33°, the wedge transducer will be conveniently tucked below the plane of the touch surface. However, the intersection of the touch surface with such a steep beveled surface leads to an acoustic discontinuity resulting in significant signal losses. In these and other cases, a touch panel with a better mechanical fit is possible if a low-acoustic-loss substrate allows the design engineer to make trade-offs that compromise transducer efficiency.

Figure 5:
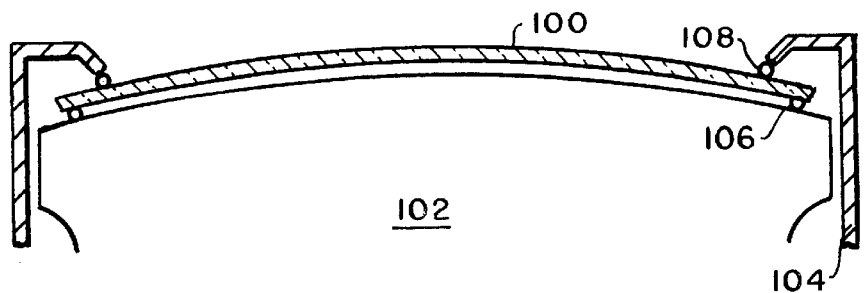
FIG. 5 is a cross sectional view of a touch panel mounted in a CRT display monitor.
Figure 6:
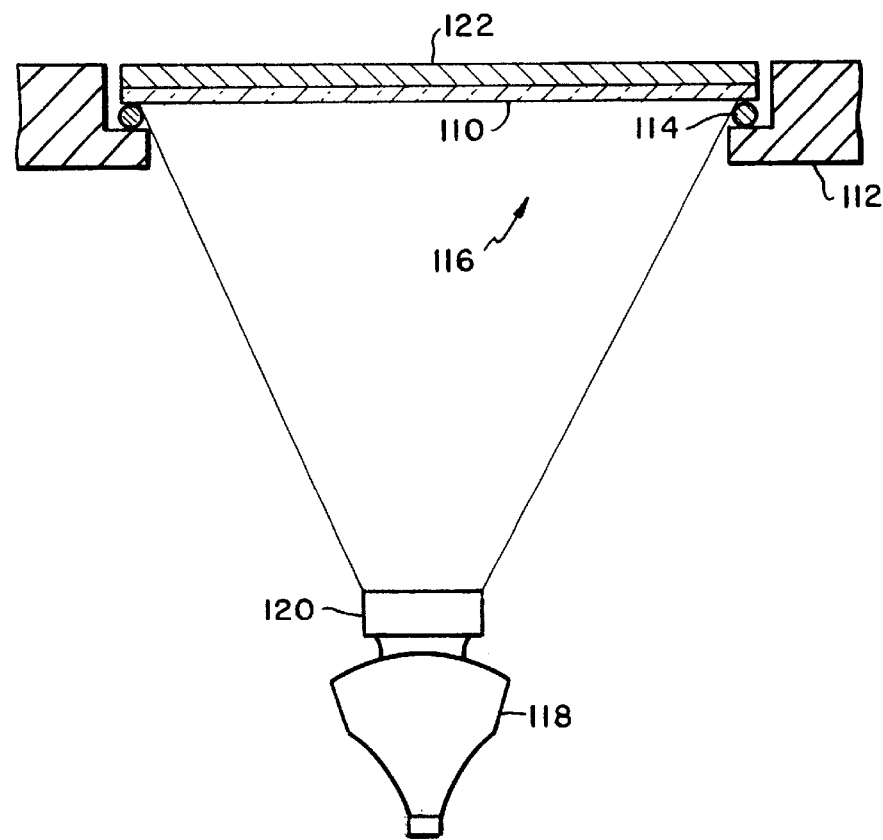
FIG. 6 is a cross sectional view of a touch panel employed to receive a projected image.

The design engineer faces another trade-off between electronic and mechanical design when there is a need for a seal between the touch surface and a display-device housing. For example, see FIG. 5. It illustrates how a touch panel 100 may be affixed to the faceplate of a cathode ray tube (CRT) 102. The touch panel 100 and CRT 102 are constrained within a CRT housing 104. The touch panel 100 is held in place by a spacer/adhesive system 106, both of which follow the curved profile of the CRT faceplate. The enclosure partially defined by the touch panel 100 and CRT housing 104 is completed by means of a circumferential resilient seal 108 placed in or near the gap between housing 104 and the touch panel 100. The seal 108 is in contact with the sensitive touch surfaces of the touch panel 100 and absorbs acoustic wave energy. Due to the increased signal budget afforded by the present invention, the seal 108 can cause an acoustic wave energy loss of at least 6 dB, and even up to 12 dB, without reducing the signal-to-noise ratio to unintelligible levels.

The design engineer faces yet another trade-off in the design of the electronics. Current controller products used with acoustic touch panels generate excitation signals of many tens of volts peak-to-peak. This relatively large excitation voltage adds to the cost of the electronic circuitry and may additionally have the side effect of contributing to the generation of unacceptable levels of EMI emissions. Much may be gained by reducing the excitation voltage by, e.g. 15 dB. However, a 15 dB reduction of excitation voltage will result in a corresponding 15 dB loss in received signal. Replacement of soda-lime glass with borosilicate or barium-containing glass provides sufficient signal budget to enable such a reduction of excitation voltage.

Perhaps the most dramatic product enhancement enabled by a low-acoustic-loss glass substrate is a significant increase in the maximum sensor size. Elo TouchSystems, Inc. has recently introduced acoustic touch panel products, based on borosilicate glass. These are large touch panels with a 21 inch diagonal dimension.

Elo initially attempted to introduce a 21 inch soda-lime glass product, but canceled the effort because signal amplitudes were insufficient to assure reliable quality performance. The sensitivity of signals to increasing size of a soda-lime touch panel is apparent from the following calculations. Assuming a standard video display aspect ratio of 3:4, a one inch increase of diagonal dimension will increase the maximum acoustic path length (maximum acoustic path length=constant+twice the X array length+the inside spacing between the X arrays) by 2.2 inches. For an attenuation of 1.5 dB/inch, each inch of added diagonal increases absorption in the substrate 3.3 dB. Adding three inches to the diagonal will drop the signal by 10 dB. Hence larger sized soda-lime acoustic touch panels rapidly become more difficult. Much larger sizes are possible with borosilicate glass as Elo TouchSystems demonstrated with a functioning 31 inch diagonal touch panel, having a laminated reverse projection screen and illuminated with a projective display, at the November 1996 Comdex tradeshow in Las Vegas. This example illustrates the use of large touch panels in a projected image configuration. See FIG. 5. A projector 118 and lens 120 projects a real-time video image on a reverse-projection screen 110 which may be laminated to the back of the substrate of an acoustic touch panel 122.

There is increasing marketplace interest in very large touch panels to be used in audio-visual applications. Use of large pieces of glass in an application that involves frequent contact may raise safety and strength concerns. As this emerging market niche matures, there may be a demand for tempered versions of very large acoustic touch panels.

Borosilicate glass cannot be tempered. Borosilicate glass has a small thermal expansion coefficient. For example, the data sheet for BoroFloat™ of Schott glass gives a thermal expansion coefficient of $3.25\times10^{-6}$/K. This makes borosilicate glass, e.g. Pyrex™, difficult to break with thermal shock. It also makes it difficult to create the stress pattern of tempered glass via rapid cooling of heated glass.

Although borosilicate glass cannot be tempered, low-acoustic-loss barium-containing glass is available, such as B270™ glass of Schott, that can be tempered. Acoustic touch panels constructed of $B_{270}$Tm glass can be both large and either heat tempered or chemically hardened.

The fact that B270™ glass can be tempered may be understood as the result of B270's thermal expansion coefficient. The B270 technical data sheet gives a mean coefficient of expansion (20° C. to 300° C.) of $9.5\times10^{-6}$/K. This is similar to soda-lime glass and very different from borosilicate glass such as BoroFloat™, whose thermal expansion coefficient is $3.25\times10^{-6}$/K. ESL 4022C glass frit, which has a thermal expansion coefficient of $8.8\times10^{-6}$/K, is used because its thermal expansion coefficient matches typical thermal expansion coefficients of soda-lime glass. For example, Starphire™ soda-lime glass has a specified thermal expansion coefficient of $9.0\times10^{-6}$/K.

The use of tempered glass substrates requires the use of a reflective-array material and cure process that does not anneal glass. For example, polymer-based low-temperature-cure reflector materials may be used. Polymer materials damp acoustic power more rapidly than more conventional glass frit reflector materials, and hence increase the need for a low-acoustic-loss substrate.

Figure 7:
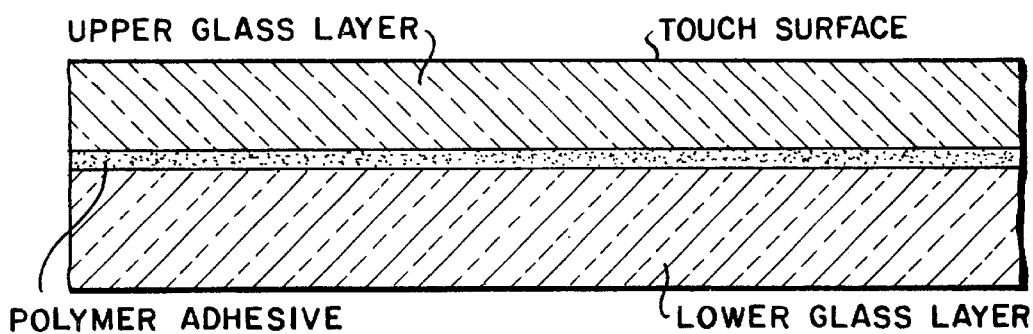
FIG. 7 is a cross sectional view of a safety glass lamination in which the outer glass layer serves as a touch panel substrate.

It is also feasible to construct large touch panels as part of a safety glass assembly, i.e., a lamination of two sheets of glass. See FIG. 7. Optionally, one or both of the sheets of glass my be heat tempered or chemically hardened. For example, a substrate for a Rayleigh-wave acoustic touch panel operating at 5.53 MHz may be a 3 mm thick layer of tempered B270™ glass that may be laminated onto a second layer of 3 mm thick tempered B270™ glass.

For a load or impact applied to the upper surface of the safety-glass substrate, much strength is added even if only the lower glass layer is tempered. When the safety glass substrate is deflected under the load, the upper layer of glass is under compression and the lower layer of glass is under tension. Glass is much stronger under compression than tension. It is most important for the layer of glass under tension to be tempered. A prototype touch panel on laminated untempered glass was broken with a heavy impact on the upper touch surface. It was the bottom layer of glass that fractured. However, the upper layer of glass did not break despite clearly visible cracks in the bottom layer of glass, and the touch panel prototype still functioned! This is experimental evidence that the lower layer of glass is the more important layer to be tempered.

A safety glass substrate may be composed of an upper layer of untemperable 3 mm BoroFloat™ glass bonded to a lower layer of 3 mm thick (or thicker) tempered soda-lime glass. However, for applications with a sufficiently broad operating temperature range, this is not a practical design due to the very different thermal expansion coefficients of borosilicate glass and soda-lime glass. Changes in temperature will cause the substrate to warp like a bi-metal strip in a thermostat.

This warpage effect has been experimentally observed. A borosilicate glass sample was glued to an untempered soda-lime glass sample. Both samples had a nominal size of 6 inches by 9 inches. This lamination was put in an oven. A 30° C. change in temperature resulted in a very visible warpage of this small laminated sample.

Warpage due to temperature changes will be much less of a problem for a lamination of, for example, untempered 3 mm thick B270 glass and tempered soda-lime glass. Note the advantage of having a low-acoustic-loss glass with a thermal expansion coefficient similar to that of standard soda-lime glass, even if the temperable low-acoustic-loss glass is not actually tempered.

There are additional advantages to a untempered low-acoustic-loss glass with a thermal expansion coefficient similar to standard soda-lime glass, for example, between 6×10.6/K and 12×10.6/K. It has been observed that the bonding between common glass frit, presently used as a reflector material for most commercial touch panel products, and borosilicate substrates is of lower quality that the bonding of glass frit reflectors on soda-lime glass substrates. This is because of the mismatch of thermal expansion coefficients between the frit and borosilicate glass. Frit compositions exist with a better match to the thermal expansion coefficient of borosilicate glass, but only at the expense of a higher cure temperature above 500° C. An advantage of heat temperable low-acoustic-loss glass over borosilicate glass is its thermal expansion coefficient which is well matched to standard glass frit products with low sintering temperatures.

As described in U.S. Pat. No. 5,591,945, it is possible to design acoustic touch panels in which Rayleigh waves propagate along the reflective arrays while horizontally polarized shear waves sense touches in the active area of the sensor (hereinafter referred to as a Rayleigh-shear-Rayleigh sensor). Such a sensor can sense a touch even if the sensor is sealed with silicone rubber (RTV). Such a sensor can sense a touch when the active area is covered with water.

A large Rayleigh-shear-Rayleigh sensor may be constructed using a low-acoustic-loss glass such as B270 glass.

For an operating frequency of 5.53 MHz, the wave mechanics of a Rayleigh-shear-Rayleigh sensor limits the glass thickness to about 3 mm. Furthermore, because a Rayleigh-shear-Rayleigh sensor is touch sensitive on both the top and bottom surfaces of the glass, it cannot be laminated as part of a safety glass substrate using standard safety-glass adhesives. (Adhesives like silicone rubber with little viscous damping are required.) These wave mechanics requirements of Rayleigh-shear-Rayleigh touch panels make a tempered low acoustic-loss barium-containing glass like B270™ particularly interesting for large Rayleigh-shear-Rayleigh touch panels.

The following examples a re intended to describe the present invention in further detail and should by no means be interpreted as defining the scope of the invention.

EXAMPLE 1
(prior art)

An ultrasonic acoustic touch panel as shown in FIG. 1 was produced using a flat soda-lime glass substrate (manufactured by Central Glass Co., Ltd. of Japan: 488 mm (width)×403 mm (length)×3.3 mm (thickness)). Rayleigh waves were excited and propagated in this acoustic touch panel. Performance of the touch panel was observed using a controller (5810EI00 manufactured by Touch Panel Systems Co., Ltd.). The soda-lime glass comprised $SiO_2$ (71% by weight), $Na_2O$ (13% by weight), $K_2O$ (1% by weight), CaO (11% by weight), MgO (2% by weight) and $Al_2O_3$ (2% by weight). The total content of the first component ($Na_2O$, CaO, MgO) was 26% by weight, while the total content of the second component ($Al_2O_3$, $ZrO_2$, $TiO_2$, $B_2O_3$, $Y_2O_3$, $SnO_2$, $PbO_2$, $In_2O_3$, $K_2O$) was 3% by weight.

The light transmission of the glass substrate in the visible ray region measured 91.8% (using a haze computer, HGM-2D manufactured by Suga Testing Apparatus Co., Ltd.). There is some uncertainty in the absolute calibration of this measurement. Nevertheless this measurement will serve well for comparisons with other glasses. (92% transmission is a theoretical upper limit given by 4% reflection at both the front and back surfaces of the glass. Reflection is caused by the index of refraction mismatch between air and glass. The index of refraction for glass is typically about n=1.5 so that reflection at a single surface, $(n-1/n+1)^2$, is about 4%.)

The propagation velocity of the acoustic waves was measured according to the method described below.

The propagation velocity of the acoustic waves was determined by varying the pitch or spacing of the elements of the reflection array and observing when the received signal amplitude is most intense. The received signal amplitude is most intense when the pitch or spacing equals an integer multiple of the acoustic wavelength corresponding to the fixed operating frequency. A set of samples was fabricated in which the reflector pitch was varied by small degrees. Having determined the wavelength from the pitch giving the maximum received amplitude, the velocity is determined from the product of the wavelength and frequency (5.53 MHz).

As with commercial Rayleigh-wave touch panel products, acoustic signals were transmitted onto and received from the glass surface with wedge transducers. Wedge transducers are composed of a ceramic piezoelectric element bonded to a plastic wedge that is in turn bonded to the glass surface. The wedge couples pressure-mode acoustic waves from the piezoelectric element to Rayleigh waves on the glass substrate. The transmitted transducer was excited by a 5.53 MHz tone burst of amplitude 50V.

In this manner, the propagation velocity of the soda-lime glass substrate was measured to be 125,000 inch/second.

The intensity of the received signal of a touch panel designed with a propagation velocity of 125,000 inch/second was measured at the receiving transducers. Measurements were made for both the X-axis and the Y-axis subsystems of the touch panel. The measured intensities were 1.41 mV and 1.69 mV, respectively. It is of interest to identify glass substrate materials that lead to larger received signal amplitudes.

EXAMPLE 2

Instead of the soda-lime glass substrate of Example 1, in this example a flat borosilicate glass substrate (sold by Schott Co. Ltd. under the trade name TEMPAX™; 488 mm (width)×403 mm (length)×3.3 mm (thickness)) was used. The glass substrate comprised $SiO_2$ (81% by weight), $Na_2O$ (3% by weight), $K_2O$ (1% by weight), $B_2O_3$ (13% by weight) and $Al_2O_3$ (2% by weight), the total content of the first component ($Na_2O$, CaO, MgO) being 3% by weight and the total content of the second component ($Al_2O_3$, $ZrO_2$, $TiO_2$, $B_2O_3$, $Y_2O_3$, $SnO_2$, $PbO_2$, $In_2O_3$, $K_2O$) being 16% by weight.

The light transmission of the glass substrate in the visible ray region measured 93.0% by the method described in Example 1. This is about 1% higher than for the soda-lime glass in Example 1. Furthermore, when viewed edge on, this glass has a pale yellow-green color rather than the dark green of common soda-lime glass; this glass has improved light transmission.

Using the test methods of Example 1, the propagation velocity of the glass substrate was measured as 122,288 inch/sec.

For the touch panel designed to have a propagation velocity of 122,288 inch/sec., the intensity of the received signal was measured, using the methods of Example 1, for both the X-axis and the Y-axis. The intensity in the X-axis (the horizontal axis in FIG. 1) was 6.66 mV, and that in the Y-axis (the vertical axis in FIG. 1) was 8.39 mV. This is more than a 12 decibel gain in received signal amplitude.

Prototype touch panels have been constructed from both TEMPAX™ borosilicate glass and BOROFLOAT™ borosilicate. In both cases, a dramatic increase in received signal intensity is observed relative to touch panels using soda-lime glass. The degree of signal increase depends on details of touch panel design; received signals typically increase between 10 and 30 decibels. The observed effect is more dramatic for larger touch panels in which acoustic waves are propagated for longer distances.

Figure 2:
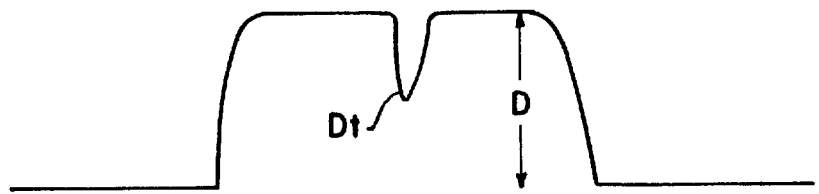
FIG. 2 is a wave profile showing the envelope of the received signals in Example 1.

The touch panel was connected to a controller to detect the coordinates of a touch position. As in FIG. 2, the received signal when the panel was touched demonstrated a pronounced drop Dt in the intensity of the received signal D, thus enabling a clear recognition of the touching position. The desired touch panel functionality is well provided.

EXAMPLE 3

In lieu of the soda-lime glass substrate used in Example 1, a flat glass substrate (Schott or Desag Co., Ltd. trade name B270-SUPERWITE or B270™: 488 mm (width)×403 mm (length)×3.3 mm (thickness)) was employed. The glass substrate comprised $SiO_2$ (69% by weight), $Na_2O$ (8% by weight), $K_2O$ (8% by weight), CaO (7% by weight), BaO (2% by weight), ZnO (4% by weight), $TiO_2$ (1% by weight) and $Sb_2O_3$ (1% by weight). The total content of the first component ($Na_2O$, CaO, MgO) was 15% by weight, and the total content of the second component ($Al_2O_3$, $ZrO_2$, $TiO_2$, $B_2O_3$, $Y_2O_3$, $SnO_2$, $PbO_2$, $In_2O_3$, $K_2O$) was 9% by weight.

The light transmission of the glass substrate in the visible ray region measured 92.8% by the same method described in Example 1. This measurement is 1% higher than for the soda-lime glass of Example 1. When viewed edge on, one sees a pale yellow-green color like the borosilicate glass of Example 2 and unlike the deep green of the soda-lime glass of Example 1.

Using the test methods of Example 1, the glass substrate was observed to have a Rayleigh-wave propagation velocity of 121,609 inch/second.

The intensity of the received signal of a touch panel having a propagation velocity of 121,609 inch/sec. was measured with regard to the X-axis and the Y-axis using the methods of Example 1. The intensities of the received signals were 7.69 mV in the X-axis and 7.50 mV in the Y-axis. Like the borosilicate glasses of Example 2, this was an increase in received signal amplitude of greater than 12 decibels with respect to standard soda-lime glass.

A touch was detected using the touch panel connected to the controller. The touch position could be accurately determined from the pronounced dip in the received signal.

Glass suppliers can heat temper or chemically harden B270™ glass using standard industrial processes.

EXAMPLE 4

STARPHIRE™ glass manufactured by PPG, like B270™ glass, is a "white" glass serving markets requiring high-transmission glass with minimal color dependence. In this sense, STARPHIRE™ and B270™ are optical equivalents.

Interestingly, they are not acoustic equivalents. STARPHIRE™ glass does not provide the low-acoustic-loss benefits provided by B270™ glass as observed in Example 3. Within measurement errors, STARPHIRE™ glass is observed to have the same acoustic attenuation as common soda-lime glass.

The composition of STARPHIRE™ glass is $SiO_2$ (73% by weight), $Na_2O$ (15% by weight), CaO (10% by weight), unspecified (2% by weight). The total content of the first component ($Na_2O$, CaO, MgO) is at least 25% by weight, while the total content of the second component ($Al_2O_3$, $ZrO_2$, $TiO_2$, $B_2O_3$, $Y_2O_3$, $SnO_2$, $PbO_2$, $In_2O_3$, $K_2O$) is at most 2% by weight.

EXAMPLE 5

The B270™ glass of Example 3 is an example of a barium-containing glass. Another example of a barium-containing glass is the glass used in the faceplate of cathode-ray-tube color monitors or television displays.

Figure 4:
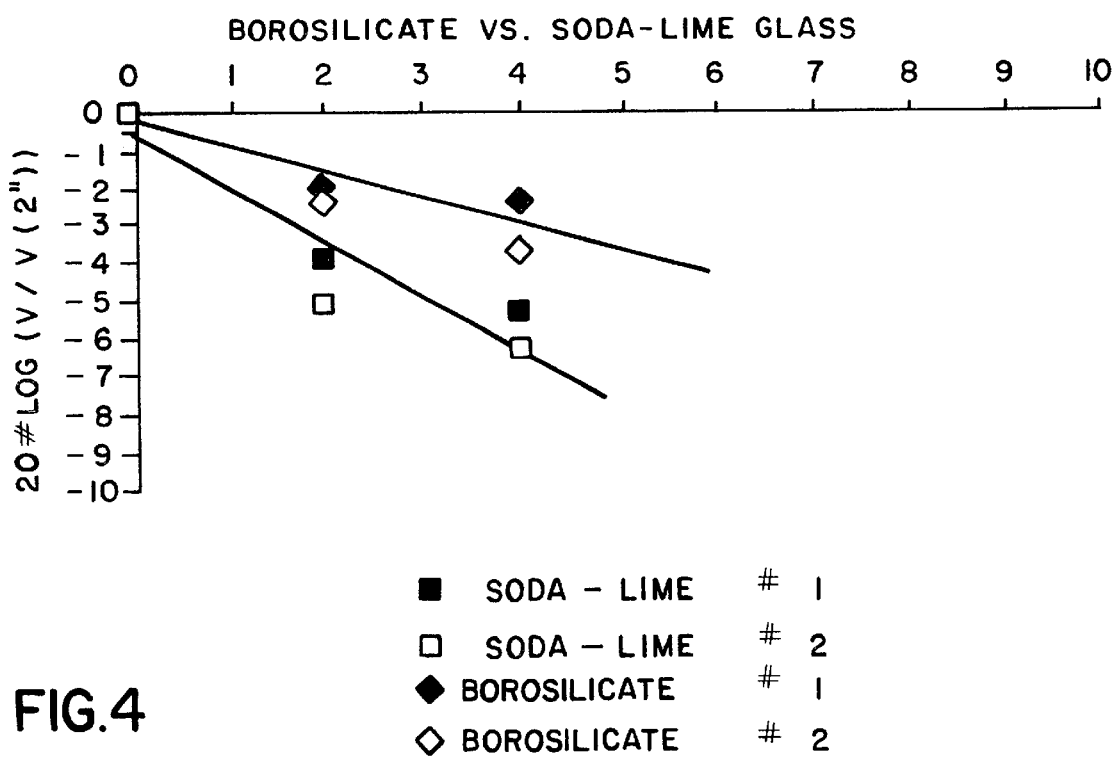
FIG. 4 is a graph of actual results of Rayleigh wave measurements, using the method illustrated in FIG. 3, for a soda-lime glass substrate and a borosilicate glass substrate.

Acoustic measurements of the type shown in FIG. 4 were performed on the faceplates of several color monitors from various sources: Zenith 1490 FTM (flat tension mask) monitor; MiniMicro MM1453M; Mitsubishi AUM-1371; Quimax DM-14+; NEC A4040; and Goldstar 1420-Plus. Samples measured were observed to have an acoustic attenuation of approximately 0.6 dB/inch. This is much like the borosilicate data in FIG. 4.

The composition of a representative faceplate glass is as follows: is $SiO_2$ (65% by weight), $Na_2O$ (7% by weight), CaO (2% by weight), MgO (1% by weight), $Al_2O_3$ (2% by weight), SrO (10% by weight), BaO (2% by weight), $PbO_2$ (2% by weight), $K_2O$ (9% by weight).

It is clearly demonstrated in the above examples that the touch panel substrates of Example 2, 3, and 5 compared to the touch panel substrates of Examples 1 and 4 can prevent attenuation or damping of acoustic waves more effectively and thus provide enhanced signal-to-noise ratios.

The foregoing specification and the accompanying FIGS. have thus described and shown a novel acoustic touch position sensor using a low-acoustic-loss glass substrate which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow

What is claimed is:

1. A touch panel provided with a glass substrate as a propagation medium for Rayleigh waves and which is used for detecting the coordinate data on a touching position, wherein the composition of the glass substrate comprises $SiO_2$ as the main component, comprises at least 1% by weight of $Na_2O$ and comprises additional components that prevent said $SiO_2$ from forming a regular crystalline lattice by disruption of Si—O—Si covalent links, and wherein said added components provide sufficiently strong alternate links through strong ionic bonding, alternate covalent bonding, or steric constraints to produce an attenuation coefficient of less than or equal to about 0.51 dB/cm as determined at the substrate surface for 5.53 MHZ Rayleigh waves as measured by the slope of a plot of amplitude versus distance for a signal through a pair of facing 0.5-inch wide wedge transducers mounted on a sample of the glass type under test having sufficient thickness to support Rayleigh wave propagation.

2. A touch panel provided with a glass substrate as a propagation medium for Rayleigh waves and which is used for detecting the coordinate data on a touching position, wherein the composition of the glass substrate comprises $SiO_2$ as the main component, at least 1% by weight of $Na_2O$ and the total content of $Na_2O$, CaO and MgO in said glass substrate is 20% by weight or less.

3. A touch panel as claimed in claim 2, wherein the total content of $Al_2O_3$, $ZrO_2$, $TiO_2$, $B_2O_3$, $Y_2O_3$, $SnO_2$, $PbO_2$, $In_2O_3$, and $K_2O$ in said glass substrate is 5% by weight or more.

4. A touch panel according to claim 2, wherein said substrate is laminated to reverse projection screen material.

5. A touch panel according to claim 2, wherein said substrate is curved in profile.

6. The touch panel according to claim 5, wherein said substrate is a glass containing at least about 1% by weight of barium oxide.

7. The touch panel according to claim 5, wherein said substrate is a glass containing at least about 2% by weight of barium oxide.

8. The touch panel according to claim 5, wherein said substrate has the approximate composition (weight % on oxide basis) $SiO_2$: 69, $Na_2O$: 8, $K_2O$: 8, CaO: 7, BaO: 2, ZnO: 4, $TiO_2$: 1, $Sb_2O_3$: 1.

9. A touch panel provided with a glass substrate as a propagation medium for Rayleigh waves and which is used for detecting the coordinate data on a touching position, wherein said glass substrate is comprised of $SiO_2$ as the main component and at least 1% by weight of $Na_2O_2$ said glass substrate having a higher light transmission than a soda-lime glass in the visible ray region.

10. A touch panel provided with a glass substrate as a propagation medium for Rayleigh waves and which is used for detecting the coordinate data on a touching position, wherein said glass substrate is comprised of $SiO_2$ as the main component, the content of $Na_2O$ is at least 1% by weight; the total content of $Na_2O$, CaO, and MgO is 20% by weight or less; and the total content of $Al_2O_3$, $ZrO_2$, $TiO_2$, $B_2O_3$, $Y_2O_3$, $SnO_2$, $PbO_2$, $In_2O_3$, and $K_2O$ is 5 percent by weight or more, and wherein said substrate comprises a glass having a higher light transmission than a soda-lime glass in the visible ray region.

11. A touch panel as claimed in claim 10 provided with a glass substrate as a propagation medium for Rayleigh waves and which is used for detecting the coordinate data on a touching position, wherein said glass substrate comprises 1 to 17% by weight of the total content of $Na_2O$, CaO and MgO, and 5 to 20% by weight of the total content of $Al_2O_3$, $ZrO_2$, $TiO_2$, $B_2O_3$, $Y_2O_3$, $SnO_2$, $PbO_2$, $In_2O_3$ and $K_2O$.

12. A touch panel as claimed in claim 10, wherein said substrate has the approximate composition (weight % on oxide basis) $SiO_2$: 69, $Na_2O$: 8, $K_2O$: 8, CaO: 7, BaO: 2, ZnO: 4, $TiO_2$: 1, $Sb_2O_3$: 1.

13. In a touch panel system comprising a substrate capable of supporting acoustic waves propagation and means for introducing said waves in said substrate, the improvement comprising said substrate being made of a temperable glass having an attenuation coefficient of less than or equal to about 0.5 dB/cm as determined at the substrate surface for 5.53 MHz Rayleigh waves as measured by the slope of a plot of amplitude versus distance for a signal through a pair of facing 0.5-inch wide wedge transducers mounted on a sample of the glass type under test having sufficient thickness to support Rayleigh wave propagation.

14. A touch panel as claimed in claim 13, wherein the acoustic waves are Rayleigh waves.

15. The touch panel according to claim 13, wherein said glass has a thermal expansion coefficient greater than about $6\times10^{-6}$/K before tempering.

16. The touch panel according to claim 13, wherein said substrate is heat-tempered and has a thermal expansion coefficient between about $6\times10^{-6}$/K and about $12\times10^{-6}$/K before tempering.

17. The touch panel according to claim 16, wherein said substrate is heat-tempered and has a thermal expansion coefficient between about $8\times10^{-6}$/K and about $10\times10^{-6}$/K before tempering.

18. The touch panel according to claim 13, wherein said attenuation coefficient is equal to or less than about 0.45 dB/cm.

19. The touch panel according to claim 13, wherein said substrate is thermally tempered and has an attenuation coefficient less than or equal to about 0.5 dB/cm.

20. A touch panel according to claim 13, wherein said substrate is comprised of $SiO_2$ as the main component and the total content of $Na_2O$, CaO and MgO in said glass substrate is 20% by weight or less.

21. A touch panel as claimed in claim 20, wherein the total content of $Al_2O_3$, $ZrO_2$, $TiO_2$, $B_2O_3$, $Y_2O_3$, $SnO_2$, $PbO_2$, $In_2O_3$ and $K_2O$ in said glass substrate is 5% by weight or more.

22. A touch panel as claimed in claim 13, wherein said glass substrate is comprised of $SiO_2$ as the main component and said glass substrate has a higher light transmission than a soda-lime glass in the visible ray region.

23. A touch panel as claimed in claim 13, wherein said glass substrate is comprised of $SiO_2$ as the main component, the total content of $Na_2O$, CaO and MgO is 20% by weight or less and the total content of $Al_2O_3$, $ZrO_2$, $TiO_2$, $B_2O_3$, $Y_2O_3$, $SnO_2$, $PbO_2$, $In_2O_3$ and $K_2O$ is 5% by weight or more, and wherein said substrate comprises a glass having a higher light transmission than a soda-lime glass in the visible ray region.

24. A touch panel as claimed in claim 13, wherein said glass substrate comprises 1 to 17% by weight of the total content of $Na_2O$, CaO and MgO, and 5 to 20% by weight of the total content of $Al_2O_3$, $ZrO_2$, $TiO_2$, $B_2O_3$, $Y_2O_3$, $SnO_2$, $PbO_2$, $In_2O_3$ and $K_2O$.

25. The touch panel according to claim 13, wherein said substrate is a barium-containing glass.

26. The touch panel according to claim 13, wherein said substrate is a glass containing at least about 1% by weight of barium oxide.

27. The touch panel according to claim 13, wherein said substrate is a glass containing at least about 2% by weight of barium oxide.

28. The touch panel according to claim 13, wherein said substrate has the approximate composition (weight % on oxide basis) $SiO_2$: 69, $Na_2O$: 4, $K_2O$: 8, CaO: 7, BaO: 2, ZnO: 4, $TiO_2$: 1, $Sb_2O_3$: 1.

29. The touch panel according to claim 13, wherein said substrate is adapted for propagating Rayleigh waves.

30. The touch panel according to claim 13, wherein said substrate is adapted for propagating horizontally polarized shear waves.

31. The touch panel according to claim 13, wherein said substrate is adapted for propagating higher order horizontally polarized shear waves.

32. The touch panel according to claim 13, wherein said substrate is adapted for propagating zeroth order horizontally polarized shear waves.

33. The touch panel according to claim 13, wherein said substrate is adapted for propagating Love waves.

34. The touch panel according to claim 13, wherein said touch sensor comprises:

a substrate having at least one touch surface and being capable of propagating an acoustic wave;

a transducer for producing an acoustic wave along a first axis in said substrate, said first axis being parallel to said surface; and a first reflecting array having a length and being disposed along said first axis, for reflecting, along said length of said array, a first reflected wave, said first reflected wave being directed along a second axis in said substrate, different from said first axis, and having a component parallel to said surface;

whereby a proximity of an object to said substrate causes a perturbation in the power carried by said first reflected wave.

35. The touch panel according to claim 13, wherein glass frit is present as a reflector material.

36. The touch panel according to claim 13, wherein there is present as a reflector material a reflector ink which is cured at a temperature below the annealing temperature of the glass.

37. The touch panel according to claim 13, wherein said substrate is a lamination of two sheets of glass comprising an inner layer and an outer layer, in which the outer layer has an attenuation coefficient less than or equal to about 0.5 dB/cm.

38. The touch panel according to claim 37, wherein said inner layer is a tempered glass.

39. The touch panel according to claim 37, wherein in said safety glass lamination both the inner layer and the outer layer are tempered glass.

40. The touch panel according to claim 37, wherein the outer layer is comprised of a glass having the approximate composition (weight % on oxide basis) $SiO_2$: 69.5, $Na_2O$: 8.1, $K_2O$: 8.3, CaO: 7.1, BaO: 2.1, ZnO: 4.2, $TiO_2$: 0.5, $Sb_2O_3$: 0.5.

41. The touch panel according to claim 37, wherein said outer layer has a thermal expansion coefficient greater than $6 \times 10^{-6}$/K.

42. The touch panel according to claim 37, wherein said inner layer is tempered soda-lime glass.

43. The touch panel according to claim 13, wherein said substrate is generally rectangular in shape, in face view, and has four substantially straight edges, the diagonal dimension of said substrate being greater than 21 inches.

44. A touch panel according to claim 13, wherein said substrate has a coating on said surface to substantially eliminate glare from reflection.

45. A touch panel according to claim 13, wherein said substrate is laminated to reverse projection screen material.

46. A touch panel according to claim 13, wherein said substrate is curved in profile.

47. In a touch sensor system comprising a substrate capable of supporting acoustic waves propagation and means for introducing said waves in said substrate, the improvement comprising said substrate being made of a chemically hardened barium-containing glass having an attenuation coefficient of less than or equal to about 0.5 dB/cm as determined at the substrate surface for 5.53 MHz Rayleigh waves as measured by the slope of a plot of amplitude versus distance for a signal through a pair of facing 0.5-inch wide wedge transducers mounted on a sample of the glass type under test having sufficient thickness to support Rayleigh wave propagation.

* * * * *